United States Patent
Cho et al.

(10) Patent No.: US 10,530,732 B2
(45) Date of Patent: Jan. 7, 2020

(54) METHOD FOR USING A CONTENT SUBSCRIPTION LIST AND ELECTRONIC DEVICE SUPPORTING THE SAME

(71) Applicant: Samsung Electronics Co., Ltd., Suwon-si, Gyeonggi-do (KR)

(72) Inventors: Kwang Hyun Cho, Suwon-si (KR); Gi Hoon Kim, Hwaseong-si (KR); Ji Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 332 days.

(21) Appl. No.: 15/290,671

(22) Filed: Oct. 11, 2016

(65) Prior Publication Data

US 2017/0104712 A1   Apr. 13, 2017

(30) Foreign Application Priority Data

Oct. 13, 2015 (KR) .................. 10-2015-0142919

(51) Int. Cl.
| | |
|---|---|
| *H04N 21/25* | (2011.01) |
| *H04L 12/58* | (2006.01) |
| *G06F 16/95* | (2019.01) |
| *H04L 29/08* | (2006.01) |
| *H04N 21/20* | (2011.01) |
| *G06F 16/9535* | (2019.01) |

(52) U.S. Cl.
CPC ............. *H04L 51/36* (2013.01); *G06F 16/95* (2019.01); *H04L 51/38* (2013.01); *H04L 67/327* (2013.01); *H04N 21/20* (2013.01); *H04N 21/25* (2013.01); *G06F 16/9535* (2019.01)

(58) Field of Classification Search
CPC .......... G06F 17/30772; G06F 3/04842; G06F 16/95; G06F 16/9535; G06Q 10/10; G06Q 30/0269; H04L 67/1095; H04L 65/403; H04L 51/36; H04L 51/38; H04L 67/327; H04N 21/47211; H04N 21/44222; H04N 21/25; H04N 21/20; H04W 4/06

See application file for complete search history.

(56) References Cited

U.S. PATENT DOCUMENTS

| | | | |
|---|---|---|---|
| 8,850,490 B1* | 9/2014 | Thomas | H04N 21/47211 725/109 |
| 9,641,574 B1* | 5/2017 | Lewis | H04L 65/403 |
| 2014/0067702 A1* | 3/2014 | Rathod | G06Q 10/10 705/319 |
| 2014/0189063 A1* | 7/2014 | Carriero | H04L 67/1095 709/219 |
| 2014/0337139 A1* | 11/2014 | Thomas | G06Q 30/0269 705/14.66 |
| 2014/0357234 A1* | 12/2014 | Sullivan | H04W 4/06 455/412.1 |
| 2014/0372905 A1 | 12/2014 | Bryant et al. | |

(Continued)

*Primary Examiner* — Le H Luu
(74) *Attorney, Agent, or Firm* — Jefferson IP Law, LLP

(57) ABSTRACT

An electronic device is provided. The electronic device includes a communication module configured to communicate with an external device, an input module configured to receive an input, and a processor configured to send a request for following a second user to a content providing server, if the request for following the second user is received from a first user and to receive at least one content, to which the second user subscribes, from the content providing server.

8 Claims, 12 Drawing Sheets

(56) References Cited

U.S. PATENT DOCUMENTS

2015/0012616 A1* 1/2015 Pearl ................... H04L 67/1095
    709/219
2015/0106444 A1* 4/2015 Schneider ......... G06F 17/30772
    709/204
2015/0181289 A1* 6/2015 Wheatley ......... H04N 21/44222
    725/14
2015/0331583 A1* 11/2015 Zhang ................. G06F 3/04842
    715/825

* cited by examiner

METHOD FOR USING A CONTENT SUBSCRIPTION LIST AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Oct. 13, 2015 in the Korean Intellectual Property Office and assigned Serial number 10-2015-0142919, the entire disclosure of which is hereby incorporated by reference.

TECHNICAL FIELD

The present disclosure relates to a content providing system that provides content to a user and a method for sharing content in various ways in the electronic device.

BACKGROUND

With the development of electronic technologies, various types of electronic products have been developed and distributed. More particularly, an electronic device, which has a variety of functions, such as a smartphone, a tablet personal computer (PC), and the like, has been widely distributed nowadays.

Because of multiple functions of the electronic device, one electronic device is capable of providing various kinds of content and services, such as an e-mail, a web surfing, photographing, a game, a message, a social network service (SNS), a music, and the like, through an application.

If a user applies for subscription to content that he/she wants through the above-mentioned electronic device, the subscribing content may be provided to the user through a content subscription service. To subscribe to content, the user may apply for the subscription for each content that the user wants.

The content subscription service may be provided through an application. For this reason, if the same application is installed in an electronic device of each of other users, the user may share content, to which the user subscribes, with the other users. If the same application is not installed in the electronic device of each of other users, the user may not share content with the other users.

Therefore, a need exists for a content providing system that provides content to a user and a method for sharing content in various ways in the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for sharing content in various ways in the electronic device.

In accordance with an aspect of the present disclosure, an electronic device is provided. The electronic device includes a communication device configured to communicate with an external device, an input device configured to receive an input, and a processor configured to send a request for following a second user to a content providing server, if the request for following the second user is received from a first user and to receive at least one content, to which the second user subscribes, from the content providing server.

In accordance with another aspect of the present disclosure, a content providing server is provided. The content providing server includes a communication device configured to communicate with an external device, a memory and a processor configured to add at least one content included in a content subscription list of a second user to a content subscription list of a first user, if a request for following the second user is received from a first electronic device of the first user and to send the at least one content to the first electronic device based on the content subscription list of the first user.

In accordance with another aspect of the present disclosure, a content providing method of an electronic device is provided. The content providing method includes receiving a request for following a second user from a first user, sending the request to a content providing server and receiving at least one content, to which the second user subscribes, from the content providing server.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
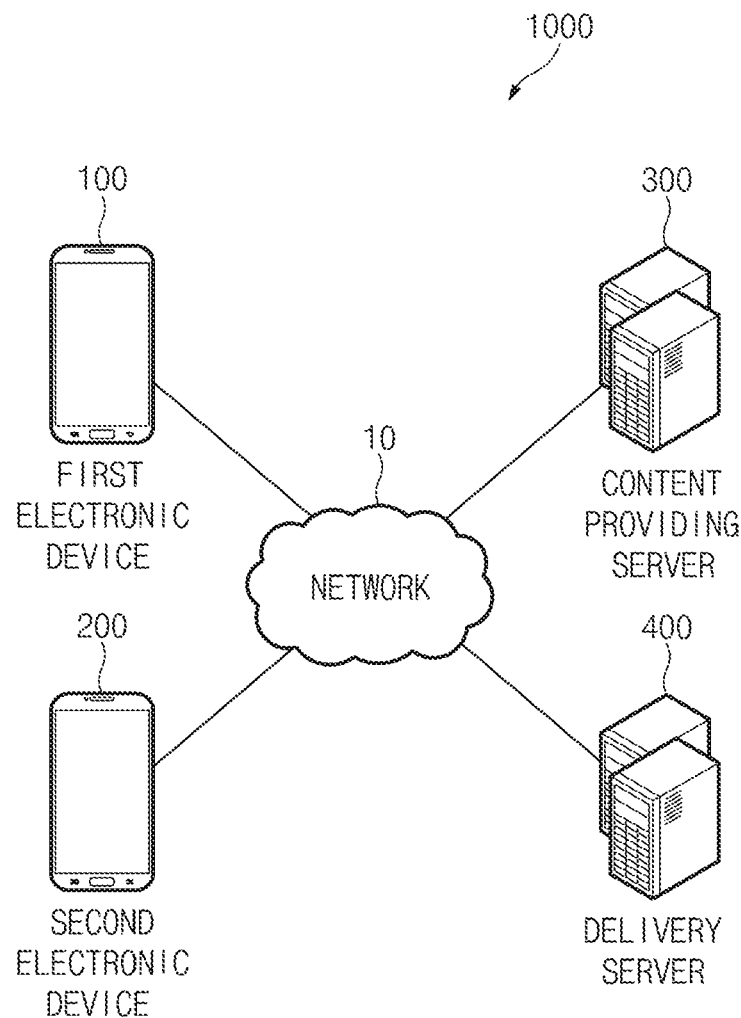
FIG. 1 is a view illustrating a content providing system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In an embodiment of the present disclosure disclosed herein, the expressions "have", "may have", "include" and "comprise", or "may include" and "may comprise" used herein indicate existence of corresponding features (e.g., elements, such as numeric values, functions, operations, or components) but do not exclude presence of additional features.

In an embodiment of the present disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, "a first user device" and "a second user device" may indicate different user devices regardless of the order or priority thereof. For example, without departing from the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal sense unless expressly so defined herein in various embodiments of the present disclosure. In some cases, even if terms are terms which are defined in the specification, they may not be interpreted to exclude embodiments of the present disclosure.

For example, an electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), a moving picture experts group (MPEG-1 or MPEG-2) audio layer 3 (MP3) players, mobile medical devices, cameras, wearable devices, and the like. According to various embodiments of the present disclosure, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

In various embodiments of the present disclosure, an electronic device may be a home appliance. The smart home appliance may include at least one of for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In various embodiments of the present disclosure, an electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of technology.

FIG. 1 is a view illustrating a content providing system according to various embodiments of the present disclosure.

Referring to FIG. 1, a content providing system 1000 may include a first electronic device 100, a second electronic device 200, a content providing server 300, and a delivery server 400. Each element of the content providing system 1000 illustrated in FIG. 1 may be connected with each other over a network 10. For example, the first electronic device 100, the second electronic device 200, the content providing server 300, and the delivery server 400 may be connected with each other over a mobile communication network or an Internet network.

According to an embodiment of the present disclosure, the first electronic device 100 may be an electronic device of a first user. The first electronic device 100 may be, for example, a smart electronic device, in which installation and execution of an application are possible, such as a smartphone, a smart watch, a smart TV, and the like. According to an embodiment of the present disclosure, the first electronic device 100 may be an electronic device, in which a content subscription application is installed. The content subscription application may be, for example, a dedicated application that is capable of receiving content from the content providing server 300. The content subscription application may provide, for example, a user interface for performing operations, such as an operation of requesting a content subscription, an operation of requesting the following of another user, an operation of delivering content to another user, an operation of displaying content, and the like. According to another embodiment of the present disclosure, the first electronic device 100 may be an electronic device, in which the content subscription application is not installed.

According to an embodiment of the present disclosure, the first electronic device 100 may request subscription to content from the content providing server 300. According to an embodiment of the present disclosure, the electronic device 100 may receive the subscribing content from the content providing server 300. According to an embodiment of the present disclosure, the first electronic device 100 may receive content through the content subscription application. According to an embodiment of the present disclosure, the first electronic device 100 may send a request for following a second user to the content providing server 300. For example, the first electronic device 100 may send the following request by using the content subscription application. For another example, the first electronic device 100 may send the following request by using another application (e.g., a web browser, and the like) different from the content subscription application. According to an embodiment of the present disclosure, the first electronic device 100 may receive a content subscription list of the second user from the content providing server 300. According to an embodiment of the present disclosure, if at least one content is selected from the content subscription list of the second user, the first electronic device 100 may send information about the selected content (hereinafter referred to as "content selection information") to the content providing server 300. According to an embodiment of the present disclosure, the first electronic device 100 may receive at least some of pieces of content, to which the second user is subscribing, from the content providing server 300 by following the second user. According to an embodiment of the present disclosure, the electronic device 100 may deliver content received from the content providing server 300 to the second electronic device 200. For example, the electronic device 100 may deliver content received through the delivery server 400 to the second electronic device 200.

According to an embodiment of the present disclosure, the second electronic device 200 may be an electronic device of the second user. According to an embodiment of the present disclosure, the second electronic device 200 may be a smart electronic device, in which installation and execution of an application are possible, such as a smartphone, a smart watch, a smart TV, and the like. According to an embodiment of the present disclosure, the second electronic device 200 may be an electronic device, in which the content subscription application is installed. According to another embodiment of the present disclosure, the second electronic device 200 may be an electronic device, in which the content subscription application is not installed. According to an embodiment of the present disclosure, the second electronic device 200 may request subscription to content from the content providing server 300. According to an embodiment of the present disclosure, the second electronic device 200 may receive the subscribing content from the content providing server 300.

According to an embodiment of the present disclosure, the second electronic device 200 may be a feature phone, in which it is not possible to install an application. According to an embodiment of the present disclosure, if the second electronic device 200 is a feature phone, it may not be possible to subscribe to content. According to an embodiment of the present disclosure, if the second electronic device 200 is a feature phone, the second electronic device 200 may receive content from an external electronic device (e.g., the first electronic device 100) through the delivery server 400.

According to an embodiment of the present disclosure, the content providing server 300 may manage sign-up information of a user who signs up for a content subscription service. The sign-up information may include, for example, user information, such as a user name, user identification (ID), an e-mail address, and the like and information of a user device, such as mobile station international integrated services digital network (ISDN) number (MSISDN), international mobile equipment identity (IMEI), and the like.

According to an embodiment of the present disclosure, the content providing server 300 may manage a content subscription list of a user who signs up for the content subscription service. According to an embodiment of the present disclosure, the content providing server 300 may provide (or send) content to an electronic device of a user, who signs up for the content subscription service, based on the content subscription list. For example, content may include various information, which occur periodically or randomly, such as a schedule (e.g., a sport game schedule, an activity schedule of an entertainer, and the like), news, weather, product information (e.g., new product release, the term of discount, and the like). According to an embodiment of the present disclosure, if a content providing event occurs, the content providing server 300 may provide (or send) content to an electronic device of a user who signs up for the content subscription service.

According to an embodiment of the present disclosure, the content providing server 300 may manage information about whether a content subscription application of an electronic device (e.g., the first electronic device 100 or the second electronic device 200) of a user, who signs up for the content subscription service, is installed.

According to an embodiment of the present disclosure, if the request for following the second user is received from the first electronic device 100, the content providing server 300 may add at least one of content included in the content subscription list of the second user to a content subscription list of the first user.

According to an embodiment of the present disclosure, if the request for following the second user is received from the first electronic device 100, the content providing server 300 may verify the content subscription list of the second user based on sign-up information of the second user included in the following request. According to an embodiment of the present disclosure, the content providing server 300 may send the verified content subscription list of the second user to the first electronic device 100. According to an embodiment of the present disclosure, the content providing server 300 may receive content selection information from the first electronic device 100. According to an embodiment of the present disclosure, the content providing server 300 may update the content subscription list of the first user based on the content selection information. For example, the content providing server 300 may add content corresponding to the content selection information to the content subscription list of the first user.

According to an embodiment of the present disclosure, the delivery server 400 may receive content from the content providing server 300 and may send the received content to the first electronic device 100 or the second electronic device 200. According to an embodiment of the present disclosure, the delivery server 400 may receive content from the content providing server 300 and may send the received content to the second electronic device 200. According to an embodiment of the present disclosure, the delivery server 400 may send content by using at least one of an e-mail, a short message service (SMS), and an instant message (IM).

According to an embodiment of the present disclosure, the delivery server 400 may manage a kind (e.g., a smartphone, a feature phone, and the like) of an electronic device (e.g., the first electronic device 100 or the second electronic device 200) of the content providing system 1000. For example, the delivery server 400 may be a server of a mobile communication company that manages mobile communication sign-up information of the second electronic device 200. According to an embodiment of the present disclosure, the delivery server 400 may send content received from the first electronic device 100 in the form of content corresponding to a kind of the second electronic device 200, to the second electronic device 200.

Figure 2:
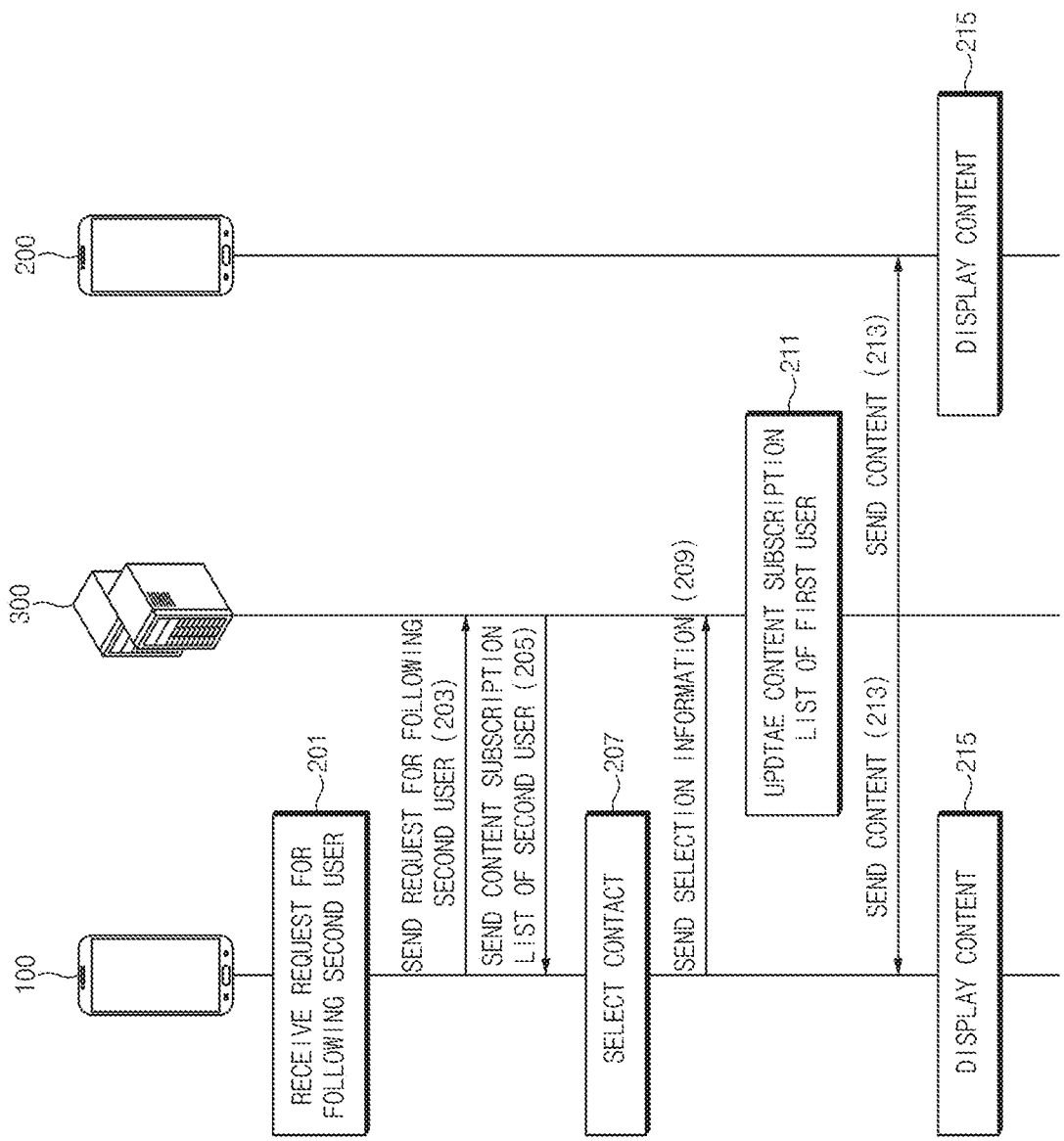
FIG. 2 is a view illustrating a content providing method of a content providing system according to various embodiments of the present disclosure.

FIG. 2 is a view illustrating a content providing method of a content providing system according to various embodiments of the present disclosure.

Referring to FIG. 2, in operation 201, the first electronic device 100 may receive a request for following a second user from a first user. According to an embodiment of the present disclosure, the first electronic device 100 may receive sign-up information of the second user, who subscribes to a content subscription service, from the first user. For example, the first electronic device 100 may receive a name, a user ID, or a mobile phone number (e.g., MSISDN) of the second user.

According to an embodiment of the present disclosure, in operation 203, the first electronic device 100 may send the request for following the second user to the content providing server 300. According to an embodiment of the present disclosure, the following request may include sign-up information of the second user.

According to an embodiment of the present disclosure, in operation 205, the content providing server 300 may send a content subscription list of the second user to the first electronic device 100. According to an embodiment of the present disclosure, if the request for following the second user is received from the first electronic device 100, the content providing server 300 may verify the content subscription list of the second user based on the sign-up information of the second user included in the following request. According to an embodiment of the present disclosure, the content providing server 300 may send the verified content subscription list of the second user to the first electronic device 100.

According to an embodiment of the present disclosure, in operation 207, the first electronic device 100 may select at least one of the content in the content subscription list of the second user. For example, the first electronic device 100 may select at least one of the content in the content subscription list of the second user based on an input. According to an embodiment of the present disclosure, the electronic device 100 may display a user interface including the content subscription list of the second user on a display. According to an embodiment of the present disclosure, the first electronic device 100 may receive an input for selecting at least one of the content in the content subscription list of the second user through the user interface.

According to an embodiment of the present disclosure, in operation 209, the first electronic device 100 may send content selection information to the content providing server 300. The content selection information may include, for example, ID information about content selected by a user.

According to an embodiment of the present disclosure, in operation 211, the content providing server 300 may update a content subscription list of the first user based on the content selection information. For example, the content providing server 300 may add content corresponding to the content selection information to the content subscription list of the first user.

According to an embodiment of the present disclosure, in operation 213, the content providing server 300 may send the selected content to the first or second electronic device 100 or 200. According to an embodiment of the present disclosure, if a content providing event associated with content, to which the first user and the second user subscribe, occurs, the content providing server 300 may send the content to the first or second electronic device 100 or 200.

According to an embodiment of the present disclosure, in operation 215, an electronic device (e.g., the first electronic device 100 or the second electronic device 200), which receives content from the content providing server 300, may display the selected content on a display.

According to the above-described embodiment of the present disclosure, as a user (e.g., the first user) of the first electronic device 100 follows a user (e.g., the second user) of the second electronic device 200, the user of the first electronic device 100 may conveniently subscribe to content that the user of the second electronic device 200 subscribes to.

Figure 3:
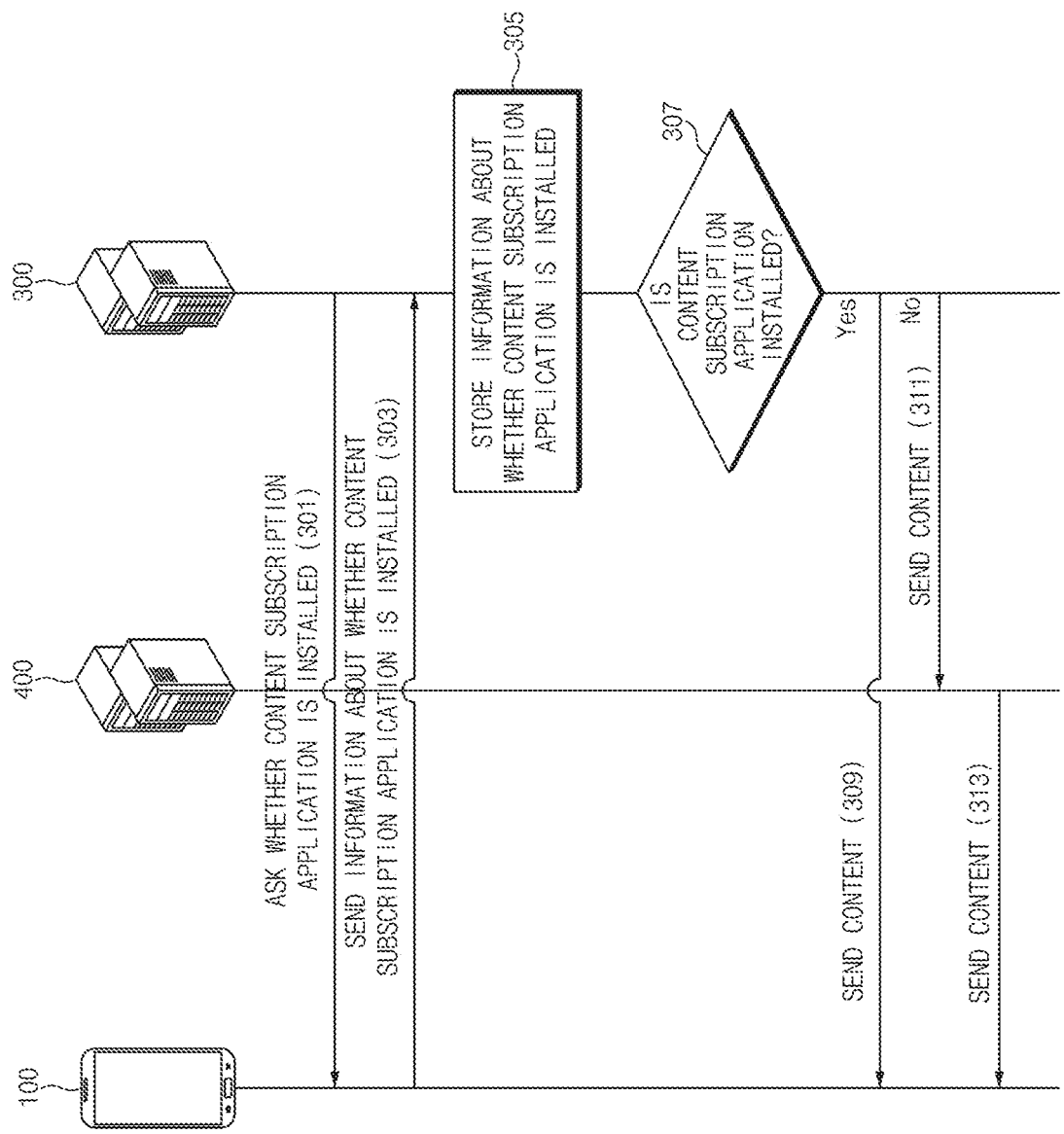
FIG. 3 is a view illustrating a content providing method of a content providing system according to various embodiments of the present disclosure.

FIG. 3 is a view illustrating a content providing method of a content providing system according to various embodiments of the present disclosure.

Referring to FIG. 3, in operation 301, the content providing server 300 may ask an electronic device (e.g., the first electronic device 100) of a user, who subscribes to a content subscription service, about whether a content subscription application is installed.

According to an embodiment of the present disclosure, in operation 303, the first electronic device 100 may send information about whether the content subscription application is installed, to the content providing server 300. For example, if the content subscription application is installed, the first electronic device 100 may send a response message. If the content subscription application is not installed, the first electronic device 100 may not send the response message.

According to an embodiment of the present disclosure, in operation 305, the content providing server 300 may store the information about whether the content subscription application is installed. For example, if the response message is received from the first electronic device 100, the content providing server 300 may store information indicating that the content subscription application is installed. If the response message is not received from the first electronic device 100, the content providing server 300 may store information indicating that the content subscription application is not installed.

According to an embodiment of the present disclosure, in operation 307, if a content providing event associated with content, to which a first user subscribes, occurs, the content providing server 300 may determine whether the content subscription application of the first electronic device 100 is installed.

According to an embodiment of the present disclosure, if it is determined that the content subscription application is installed, in operation 309, the content providing server 300 may send the content to the first electronic device 100. For example, the content providing server 300 may send the content through the content subscription application installed in the first electronic device 100. According to an embodiment of the present disclosure, the content providing server 300 may send first-type content that is supported by an electronic device, in which the content subscription application is installed. The first-type content may be, for example, a file that is recognizable (or executable) by the content subscription application.

According to an embodiment of the present disclosure, if it is determined that the content subscription application is not installed, in operation 311, the content providing server 300 may send the content to the delivery server 400. For example, the content providing server 300 may send the content to the delivery server 400 by using at least one of an e-mail, an SMS, and an IM. According to an embodiment of the present disclosure, the content providing server 300 may send second-type content that is supported by an electronic device, in which the content subscription application is not installed. For example, the second-type content may include at least one of a link address (e.g., a uniform resource locator (URL) address) that includes information about content, a file that is recognizable (or executable) by an application (e.g., a schedule application) different from the content subscription application, or a text including information about the content. For example, the application different from the content subscription application may include at least one of a calendar application, an alarm application, a web browsing application, a schedule application, a message application, an e-mail application, or a gallery application.

According to an embodiment of the present disclosure, if the content is received from the content providing server 300, in operation 313, the delivery server 400 may send the content to the first electronic device 100. For example, the delivery server 400 may send the content to the first electronic device 100 by using at least one of an e-mail, an SMS, and an IM.

According to the above-described embodiment of the present disclosure, the content providing server 300 may provide content in the form supported by an electronic device of a user who subscribes to the content subscription service, and the user may be provided with the content even though the content subscription application is not installed in the electronic device.

Figure 4:
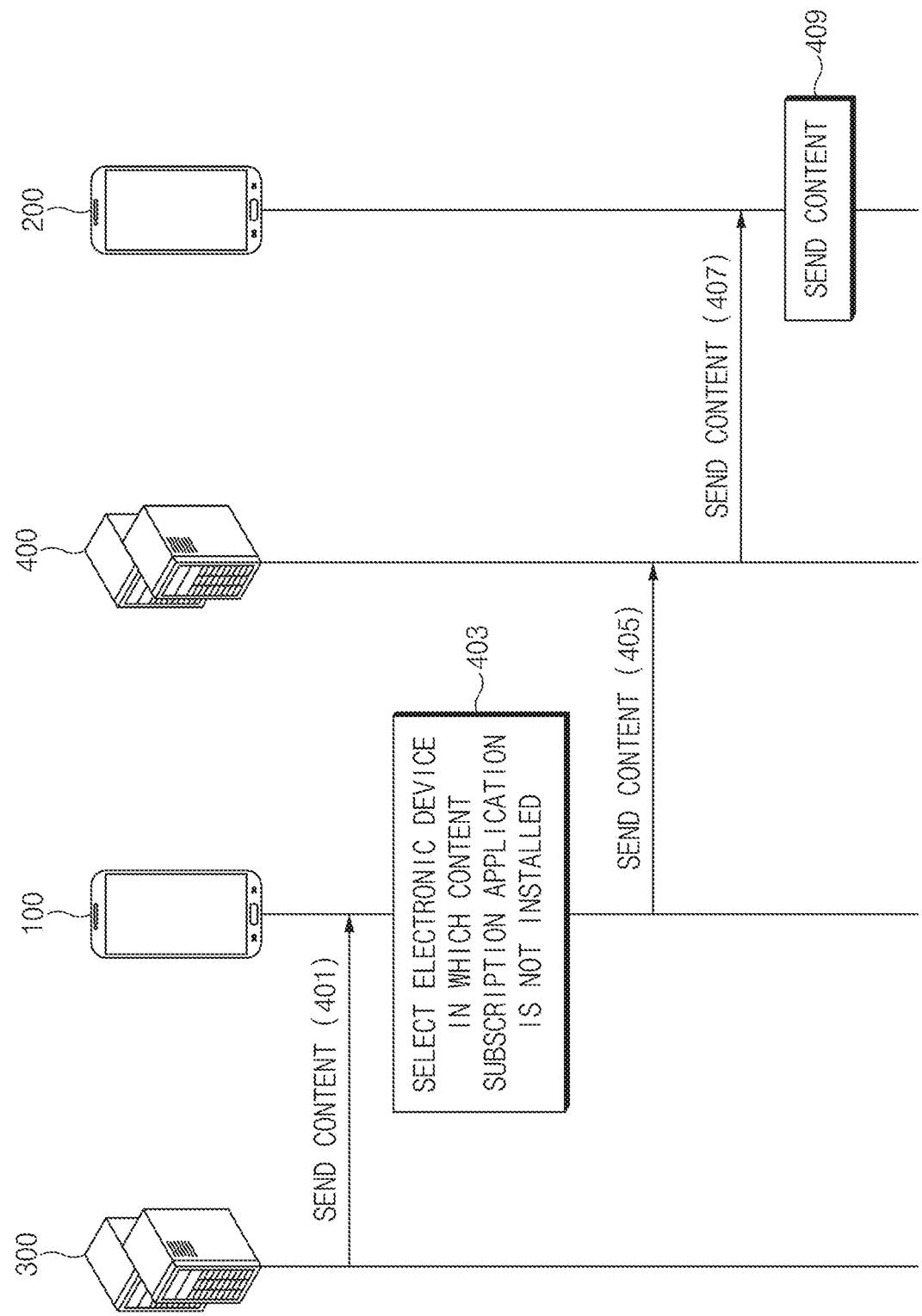
FIG. 4 is a view illustrating a content providing method of a content providing system according to various embodiments of the present disclosure.

FIG. 4 is a view illustrating a content providing method of a content providing system according to various embodiments of the present disclosure.

Referring to FIG. 4, in operation 401, the content providing server 300 may provide content to the first electronic device 100. According to an embodiment of the present disclosure, the content providing server 300 may send first-type content that is supported by an electronic device in which a content subscription application is installed together with second-type content that is supported by an electronic device in which the content subscription application is not installed.

According to an embodiment of the present disclosure, in operation 403, the first electronic device 100 may select the electronic device in which the content subscription application is not installed. For example, the first electronic device 100 may select the electronic device (e.g., the second electronic device 200) in which the content subscription application is not installed, based on an input.

According to an embodiment of the present disclosure, in operation 405, the first electronic device 100 may send the content received in operation 401 to the delivery server 400. According to an embodiment of the present disclosure, the first electronic device 100 may send, for example, the content to the delivery server 400 by using at least one of an e-mail, an SMS, and an IM. According to an embodiment of the present disclosure, the first electronic device 100 may send second-type content of the content received from the content providing server 300.

According to an embodiment of the present disclosure, in operation 407, the delivery server 400 may send the content to the second electronic device 200. According to an embodiment of the present disclosure, the delivery server 400 may send the content received from the first electronic device 100 in the form of content corresponding to a kind of the second electronic device 200, to the second electronic device 200. For example, in the case where the second electronic device 200 is a smartphone, the delivery server 400 may send a link address (e.g., a URL address) including information about the content or the content in the form of a file that is recognizable by another application (e.g., a schedule application). For another example, in the case where the second electronic device 200 is a feature phone, the delivery server 400 may send information about the content in the form of text. For example, the delivery server 400 may send the content to the second electronic device 200 by using at least one of an e-mail, an SMS, and an IM.

According to an embodiment of the present disclosure, in operation 409, the second electronic device 200 may display the content received from the delivery server 400.

Figure 5:
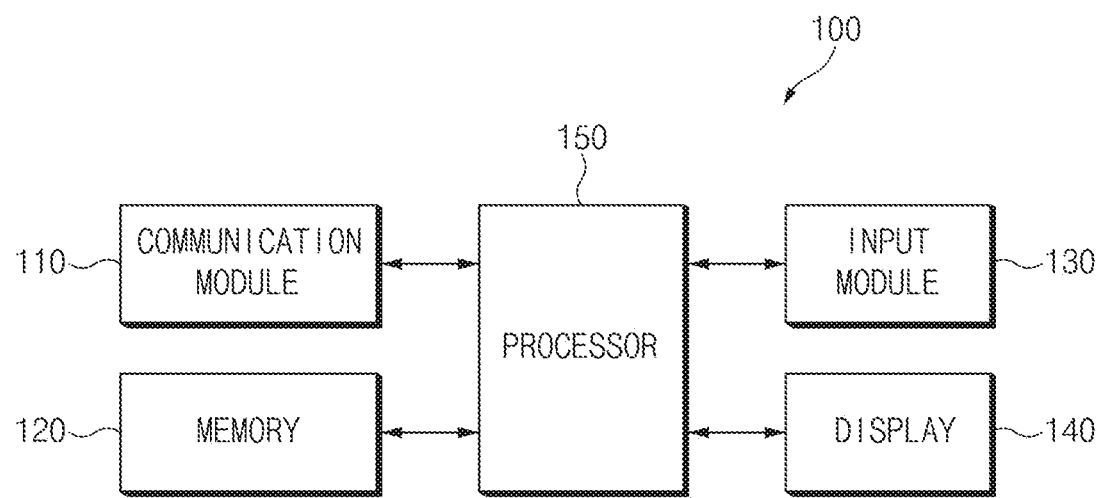
FIG. 5 is a block diagram illustrating a configuration of a first electronic device according to various embodiments of the present disclosure.

FIG. 5 is a block diagram illustrating a configuration of a first electronic device according to various embodiments of the present disclosure.

The first electronic device 100 illustrated in FIG. 5 may include, for example, all or a part of an electronic device 1001 illustrated in FIG. 10 that will be described later.

Referring to FIG. 5, the first electronic device 100 may include a communication module 110, a memory 120, an input module 130, a display 140, and a processor 150.

According to an embodiment of the present disclosure, the communication module 110 may communicate with an external device (e.g., the content providing server 300 or the delivery server 400). According to an embodiment of the present disclosure, the communication module 110 may send and receive data (e.g., a following request, a content subscription list, content, and the like) to and from an external device over a network (e.g., a mobile communication network or an Internet network). According to an embodiment of the present disclosure, the communication module 110 may include a cellular module, a wireless fidelity (Wi-Fi) module, a Bluetooth module, a near field communication (NFC) module, a magnetic secure transmission (MST) module, a global navigation satellite system (GNSS) module, and the like.

According to an embodiment of the present disclosure, the memory 120 may store content received from the content providing server 300. According to an embodiment of the present disclosure, the memory 120 may store contacts. The contacts may include a name, a phone number, an e-mail address, and the like of another user. According to an embodiment of the present disclosure, the memory 120 may store information indicating that a content subscription application is installed in an electronic device of each user included in contacts. According to an embodiment of the present disclosure, the memory 120 may store a content subscription list of a user e.g., a first user).

According to an embodiment of the present disclosure, the input module 130 may receive an input. According to an embodiment of the present disclosure, the input module 130 may receive an input through a user interface provided by the content subscription application. According to an embodiment of the present disclosure, the input module 130 may receive a request for following a second user. For example, the input module 130 may receive sign-up information (e.g., a name, a user ID, or a mobile phone number (e.g., MSISDN) of the second used about a content subscription service of the second user. According to an embodiment of the present disclosure, the input module 130 may receive an input for selecting at least one of content included in a content subscription list of the second user. According to an embodiment of the present disclosure, the input module 130 may receive an input for selecting an electronic device in which the content subscription application is not installed.

According to an embodiment of the present disclosure, the input module 130 may include a touch sensor panel for detecting a touch manipulation of a user or a pen sensor panel for detecting a pen manipulation of a user. According to an embodiment of the present disclosure, the input module 130 may detect a user manipulation input within a specific distance while indirectly making contact with the panel, as well as a user manipulation that directly makes contact with the panel (e.g., a touch sensor panel or a pen sensor panel).

According to an embodiment of the present disclosure, a user interface may be displayed on the display 140. According to an embodiment of the present disclosure, the display 140 may display the user interface for performing operations, such as an operation of requesting subscription to content provided by the content subscription application, an operation of requesting the following of another user, an operation of delivering content to another user, an operation of displaying content, and the like.

According to an embodiment of the present disclosure, the processor 150 may control overall operations of the first electronic device 100. According to an embodiment of the present disclosure, the processor 150 may provide content to a user according to various embodiments of the present disclosure by controlling each of the communication module 110, the memory 120, the input module 130, and the display 140. According to an embodiment of the present disclosure, the processor 150 (e.g., an AP) may he implemented with a system on chip (SoC) including a CPU, a graphics processing unit (GPU), a memory, and the like.

According to an embodiment of the present disclosure, if a request for following the second user is received from a user (e.g., the first user), the processor 150 may send the request for following the second user to the content providing server 300 through the communication module 110. For example, the following request may include sign-up information of the second user.

According to an embodiment of the present disclosure, if the content subscription list of the second user is received from the content providing server 300, the processor 150 may display a user interface that includes the content subscription list of the second user, on the display 140. According to an embodiment of the present disclosure, the processor 150 may differently display content, to which the first user subscribes, and content, to which the first user does not subscribe, among content included in the content subscription list of the second user. According to an embodiment of the present disclosure, the processor 150 may distinguish between content, to which the first user subscribes, and content, to which the first user does not subscribe, by using the content subscription list of the first user stored in the memory 120.

According to an embodiment of the present disclosure, if an input for selecting at least one of the content included in the content subscription list of the second user is received, the processor 150 may send selection information of the at least one content to the content providing server 300 through the communication module 110. For example, the processor 150 may receive an input through the user interface that includes the content subscription list of the second user.

According to an embodiment of the present disclosure, if at least one of content, to which the second user subscribes, is received from the content providing server 300 according to the following request, the processor 150 may display the received content on the display 140. According to an embodiment of the present disclosure, the content received form the content providing server 300 may include at least one of first-type content that is supported by an electronic device in which the content subscription application is installed and second-type content that is supported by an electronic device in which the content subscription application is not installed. The first-type content may be, for example, a file that is recognizable (or executable) by the content subscription application. For example, the second-type content may include at least one of a link address (e.g., a URL address) that includes information about the content, a file that is recognizable (or executable) by an application (e.g., a schedule application) different from the content subscription application, or a text including information about the content. According to an embodiment of the present disclosure, if the content subscription application is installed in the first electronic device 100, the processor 150 may display first-type content by using the user interface provided by the content subscription application. According to an embodiment of the present disclosure, if the content subscription application is not installed in the first electronic device 100, the processor 150 may display second-type content by using a user interface provided by an application different from the content subscription application. For example, the application different from the content subscription application may include at least one of a calendar application, an alarm application, a web browsing application, a schedule application, a message application, an e-mail application, or a gallery application.

According to an embodiment of the present disclosure, if a query message to determine whether the content subscription application is installed is received from the content providing server 300, the processor 150 may determine whether the content subscription application is installed in the first electronic device 100. According to an embodiment of the present disclosure, if the content subscription application is installed, the processor 150 may send a response message through the communication module 110. If the content subscription application is not installed, the processor 150 may not send the response message. For example, if the content subscription application is installed, the processor 150 may send the response message by using the content subscription application.

According to an embodiment of the present disclosure, if content is received from the content providing server 300, the processor 150 may display a user interface, which includes contacts stored in the memory 120, on the display 140. For example, if a command for sharing a specific content is received from a user, the processor 150 may display the user interface that includes contacts, on the display 140. For example, the user interface may include information about whether the content subscription application is installed in an electronic device of each user included in the contacts.

According to an embodiment of the present disclosure, if an input for selecting the second electronic device 200, in which the content subscription list is not installed, is received, the processor 150 may send content to the second electronic device 200 through the communication module 110. For example, the processor 150 may receive an input through a user interface that includes a list of contacts. According to an embodiment of the present disclosure, the processor 150 may send content to the second electronic device 200 through the delivery server 400. According to an embodiment of the present disclosure, the processor 150 may send, for example, the content to the second electronic device 200 by using at least one of an e-mail, an SMS, and an IM. According to an embodiment of the present disclosure, the processor 150 may send second-type content, which is supported by an electronic device in which the content subscription application is not installed, among content received from the content providing server 300.

Figure 6:
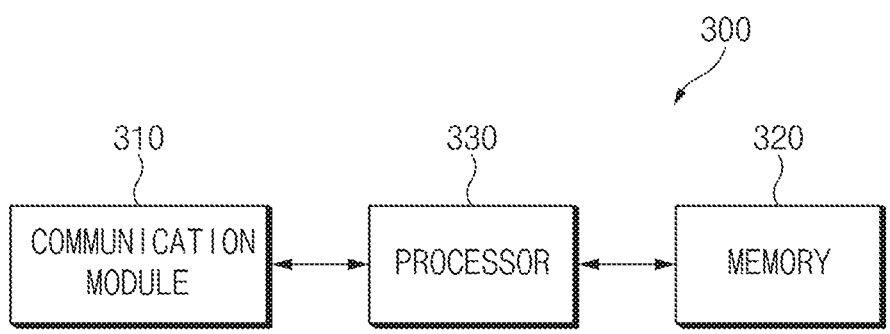
FIG. 6 is a block diagram illustrating a configuration of a content providing server according to various embodiments of the present disclosure.

FIG. 6 is a block diagram illustrating a configuration of a content providing server according to various embodiments of the present disclosure.

Referring to FIG. 6, the content providing server 300 may include a communication module 310, a memory 320, and a processor 330.

According to an embodiment of the present disclosure, the communication module 310 may communicate with an external device (e.g., the first external device 100, the second electronic device 200, or the delivery server 400), According to an embodiment of the present disclosure, the communication module 310 may send and receive data (e.g., a following request, a content subscription list, content, and the like) to and from an external device over a network (e.g., a mobile communication network or an Internet network).

According to an embodiment of the present disclosure, the memory 320 may store sign-up information of each user who signs up for a content subscription service. The sign-up information may include, for example, user information, such as a user name, a user ID, an e-mail address, and the like and information of a user device, such as MSISDN, IMEI, and the like. According to an embodiment of the present disclosure, the memory 320 may store a content subscription list of a user who signs up for the content subscription service. According to an embodiment of the present disclosure, the memory 320 may store information about whether a content subscription application of an electronic device (e.g., the first electronic device 100 or the second electronic device 200) of a user, who signs up for the content subscription service, is installed. According to an embodiment of the present disclosure, the memory 320 may store content provided by the content subscription service.

The processor 330 may control overall operations of the content providing server 300. According to an embodiment of the present disclosure, the processor 330 may provide content to a user according to various embodiments of the present disclosure by controlling each of the communication module 310 and the memory 320.

According to an embodiment of the present disclosure, if a request for following a second user is received from the first electronic device 100, the processor 330 may add at least one of content included in a content subscription list of the second user to a content subscription list of a first user. For example, if the request for following the second user is received, the processor 330 may add all content included in the content subscription list of the second user to the content subscription list of the first user. For another example, if the request for following the second user is received, the processor 330 may send the content subscription list of the second user to the first electronic device 100 through the communication module 310. If selection information about at least one of the content, to which the second user subscribes, is received from the first electronic device 100, the processor 330 may add content corresponding to the selection information to the content subscription list of the first user.

According to an embodiment of the present disclosure, based on the content subscription list, the processor 330 may send content to an electronic device (e.g., the first and second electronic device 100 and 200) through the communication module 310. According to an embodiment of the present disclosure, if a content providing event occurs, the processor 330 may verify the content subscription list and may send content to an electronic device that subscribes to the content associated with the event.

According to an embodiment of the present disclosure, the processor 330 may ask an electronic device (e.g., the first and second electronic device 100 and 200) of a user, who signs up for the content subscription service, about whether the content subscription application is installed, through the communication module 310. According to an embodiment of the present disclosure, the processor 330 may store information about whether the content subscription application is installed, in the memory 320. For example, if a response message is received from an electronic device, the processor 330 may store information indicating that the content subscription application is installed. If the response message is not received from an electronic device, the processor 330 may store information indicating that the content subscription application is not installed.

According to an embodiment of the present disclosure, if a content providing event occurs, the processor 330 may determine whether the content subscription application of an electronic device (e.g., the first electronic device 100), which subscribes to content associated with the event, is installed. According to an embodiment of the present disclosure, if it is determined that the content subscription application is installed in an electronic device, the processor 330 may send content to the electronic device through the content subscription application installed in the electronic device. According to an embodiment of the present disclosure, the processor 330 may send first-type content that is supported by an electronic device in which the content subscription application is installed. The first-type content may be, for example, a file that is recognizable by the content subscription application. According to an embodiment of the present disclosure, if it is determined that the content subscription application is not installed in the first electronic device 100, the processor 330 may send content to the first electronic device 100 through the communication module 310. According to an embodiment of the present disclosure, the processor 330 may send content to the first electronic device 100 through the delivery server 400. According to an embodiment of the present disclosure, the processor 330 may send, for example, content to the first electronic device 100 by using at least one of an e-mail, an SMS, and an IM. According to an embodiment of the present disclosure, the processor 330 may send second-type content that is supported by the first electronic device 100 in which the content subscription application is not installed. For example, the second-type content may include at least one of a link address (e.g., a URL address) that includes information about the content, a file that is recognizable (or executable) by another application (e.g., a schedule application), or a text including information about the content.

Figure 7:
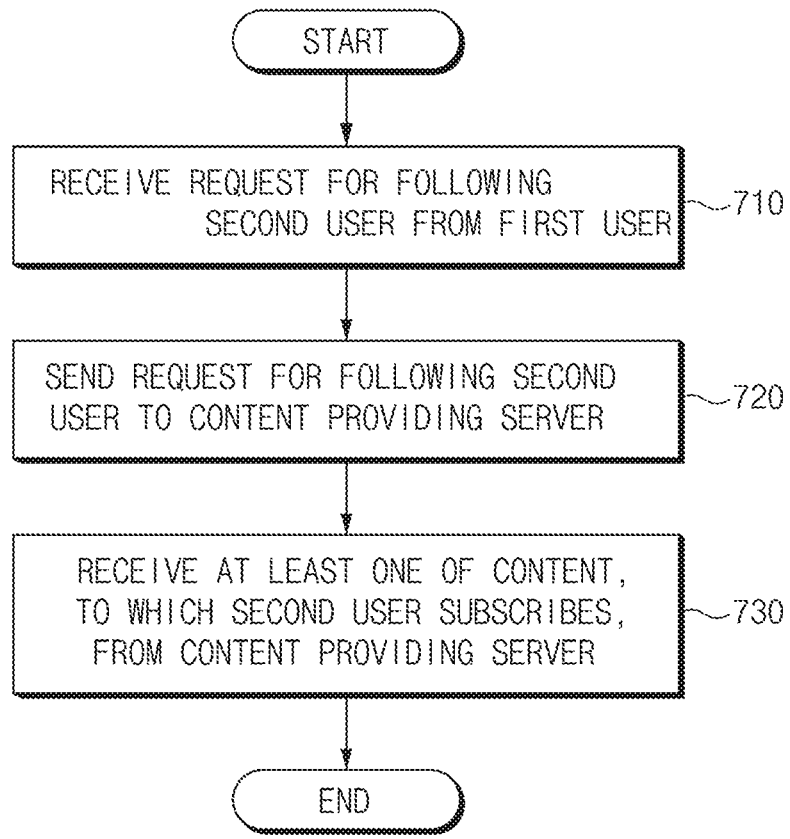
FIG. 7 is a flowchart illustrating a content providing method of a first electronic device according to various embodiments of the present disclosure.

FIG. 7 is a flowchart illustrating a content providing method of a first electronic device according to various embodiments of the present disclosure.

The flowchart illustrated in FIG. 7 may include operations processed in the first electronic device 100 illustrated in FIG. 5. Thus, even though omitted below, a description about the first electronic device 100 given with reference to FIG. 5 may be applied to the flowchart illustrated in FIG. 7.

Referring to FIG. 7, in operation 710, the first electronic device 100 may receive a request for following a second user from a first user. For example, the first electronic device 100 may receive sign-up information (e.g., a name, a user ID, or a mobile phone number (e.g., MSISDN) of the second user) about a content subscription service of the second user.

According to an embodiment of the present disclosure, in operation 720, the first electronic device 100 may send the request for following the second user to the content providing server 300. For example, the following request may include the sign-up information of the second user.

According to an embodiment of the present disclosure, the first electronic device 100 may receive a content subscription list of the second user from the content providing server 300 according to the following request. According to an embodiment of the present disclosure, the electronic device 100 may display a user interface including the content subscription list of the second user on a display. According to an embodiment of the present disclosure, the processor 100 may differently display content, to which the first user subscribes, and content, to which the first user does not subscribe, among content included in the content subscription list of the second user. According to an embodiment of the present disclosure, the first electronic device 100 may distinguish between content, to which the first user subscribes, and content, to which the first user does not subscribe, by using a content subscription list of the first user stored in a memory. According to an embodiment of the present disclosure, if an input for selecting at least one of the content included in the content subscription list of the second user is received, the first electronic device 100 may send selection information of the at least one content to the content providing server 300 through a communication module. For example, the first electronic device 100 may receive an input through the user interface that includes the content subscription list of the second user.

According to an embodiment of the present disclosure, in operation 730, the first electronic device 100 may receive at least one of the content, to which the second user subscribes, from the content providing server 300. According to an embodiment of the present disclosure, the content received form the content providing server 300 may include at least one of first-type content that is supported by an electronic device in which the content subscription application is installed and second-type content that is supported by an electronic device in which the content subscription application is not installed.

According to an embodiment of the present disclosure, if the at least one of the content, to which the second user subscribes, is received from the content providing server 300 according to the following request, the first electronic device 100 may display the received content on a display of the present disclosure. According to an embodiment of the present disclosure, the content received form the content providing server 300 may include at least one of first-type content that is supported by an electronic device in which the content subscription application is installed and second-type content that is supported by an electronic device in which the content subscription application is not installed. According to an embodiment of the present disclosure, if the content subscription application is installed in the first electronic device 100, the processor 150 may display first-type content by using the user interface provided by the content subscription application. According to an embodiment of the present disclosure, if the content subscription application is not installed in the first electronic device 100, the first electronic device 100 may display second-type content by using a user interface provided by an application different from the content subscription application. For example, the application different from the content subscription application may include at least one of a calendar application, an alarm application, a web browsing application, a schedule application, a message application, an e-mail application, or a gallery application.

Figure 8:
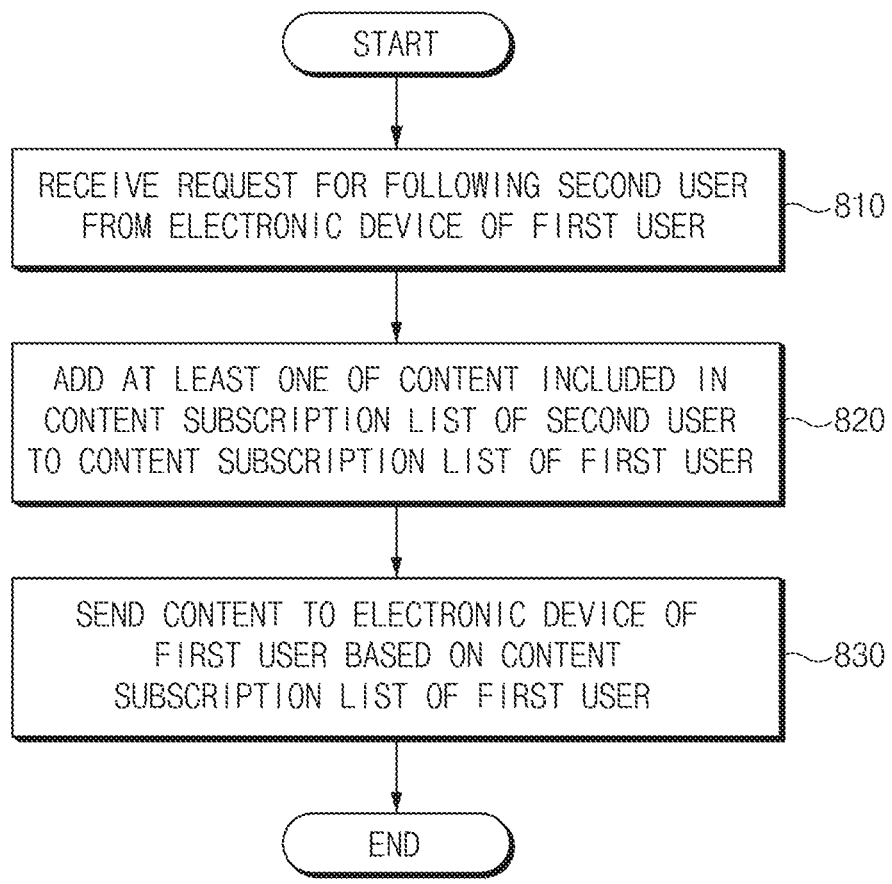
FIG. 8 is a flowchart illustrating a content providing method of a content providing server according to various embodiments of the present disclosure.

FIG. 8 is a flowchart illustrating a content providing method of a content providing server according to various embodiments of the present disclosure.

A flowchart illustrated in FIG. 8 may include operations that the content providing server 300 illustrated in FIG. 6 processes. Thus, even though omitted below, a description about the content providing server 300 given with reference to FIG. 6 may be applied to the flowchart illustrated in FIG. 8.

Referring to FIG. 8, according to an embodiment of the present disclosure, in operation 810, the content providing server 300 may receive a request for following a second user from the first electronic device 100.

According to an embodiment of the present disclosure, in operation 820, the content providing server 300 may add at least one of content included in a content subscription list of the second user to a content subscription list of a first user. For example, if the request for following the second user is received, the content providing server 300 may add all content included in the content subscription list of the second user to the content subscription list of the first user. For another example, if the request for following the second user is received, the content providing server 300 may send the content subscription list of the second user to the first electronic device 100. If selection information about at least one of the content, to which the second user subscribes, is received from the first electronic device 100, the content providing server 300 may add content corresponding to the selection information to the content subscription list of the first user.

According to an embodiment of the present disclosure, in operation 830, the content providing server 300 may send content to the first electronic device 100 based on the content subscription list of the first user. According to an embodiment of the present disclosure, if a content providing event occurs, the content providing server 300 may verify the content subscription list and may send content to an electronic device that subscribes to the content associated with the event.

According to an embodiment of the present disclosure, the content providing server 300 may ask the first electronic device 100 about whether the content subscription application is installed. According to an embodiment of the present disclosure, based on a response from the first electronic device 100, the content providing server 300 may store information about whether the content subscription application is installed, in the memory 320. For example, if a response message is received from an electronic device, the content providing server 300 may store information indicating that the content subscription application is installed. If the response message is not received from the electronic device, the content providing server 300 may store information indicating that the content subscription application is not installed.

According to an embodiment of the present disclosure, if a content providing event occurs, the content providing server 300 may determine whether the content subscription application of the first electronic device 100 is installed. According to an embodiment of the present disclosure, if it is determined that the content subscription application is installed in the first electronic device 100, the content providing server 300 may send content to the first electronic device 100 through the content subscription application installed in the first electronic device 100. According to an embodiment of the present disclosure, the content providing server 300 may send first-type content that is supported by the first electronic device 100 in which the content subscription application is installed. The first-type content may be, for example, a file that is recognizable by the content subscription application. According to an embodiment of the present disclosure, if it is determined that the content subscription application is not installed in the first electronic device 100, the content providing server 300 may send content to the first electronic device 100 through the delivery server 400. For example, the content providing server 300 may send, for example, content to the first electronic device 100 by using at least one of an e-mail, an SMS, and an IM. According to an embodiment of the present disclosure, the content providing server 300 may send second-type content that is supported by the first electronic device 100 in which the content subscription application is not installed. For example, the second-type content may include at least one of a link address (e.g., a URL address) that includes information about the content, a file that is recognizable (or executable) by another application (e.g., a schedule application), or a text including information about the content.

Figure 9:
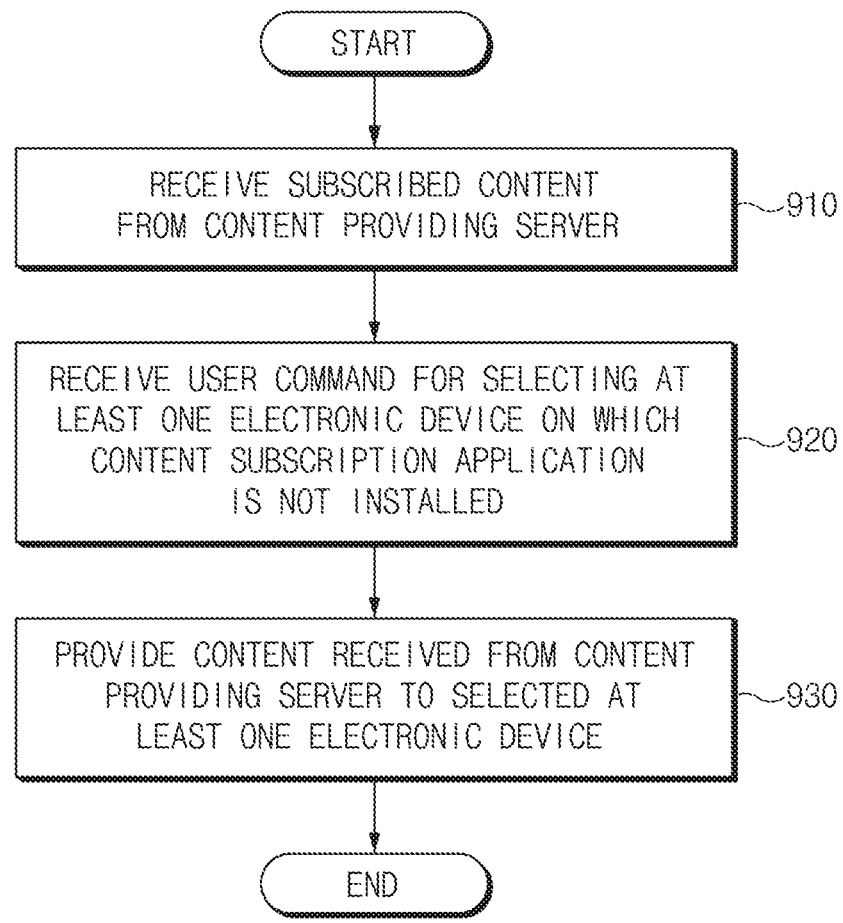
FIG. 9 is a flowchart illustrating a content providing method of a first electronic device according to various embodiments of the present disclosure.

FIG. 9 is a flowchart illustrating a content providing method of a first electronic device according to various embodiments of the present disclosure.

The flowchart illustrated in FIG. 9 may include operations processed in the first electronic device 100 illustrated in FIG. 5. Thus, even though omitted below, a description about the first electronic device 100 given with reference to FIG. 5 may be applied to the flowchart illustrated in FIG. 9.

Referring to FIG. 9, in operation 910, the first electronic device 100 may receive subscribing content from the content providing server 300.

According to an embodiment of the present disclosure, in operation 920, the first electronic device 100 may receive an input for selecting at least one electronic device in which a content subscription application is not installed. According to an embodiment of the present disclosure, if content is received from the content providing server 300, the first electronic device 100 may display a user interface that includes contacts on a display. For example, the user interface may include information about whether the content subscription application is installed in an electronic device of each user included in the contacts. For example, the first electronic device 100 may receive an input through the user interface that includes the contacts.

According to an embodiment of the present disclosure, in operation 930, the first electronic device 100 may send the content received from the content providing server 300 to the selected electronic device. According to an embodiment of the present disclosure, the first electronic device 100 may send the content to the selected electronic device through the delivery server 400. According to an embodiment, of the present disclosure the first electronic device 100 may send, for example, the content by using at least one of an e-mail, an SMS, and an IM. According to an embodiment of the present disclosure, the first electronic device 100 may send second-type content, which is supported by an electronic device in which the content subscription application is not installed, among the content received from the content providing server 300.

Figure 10:
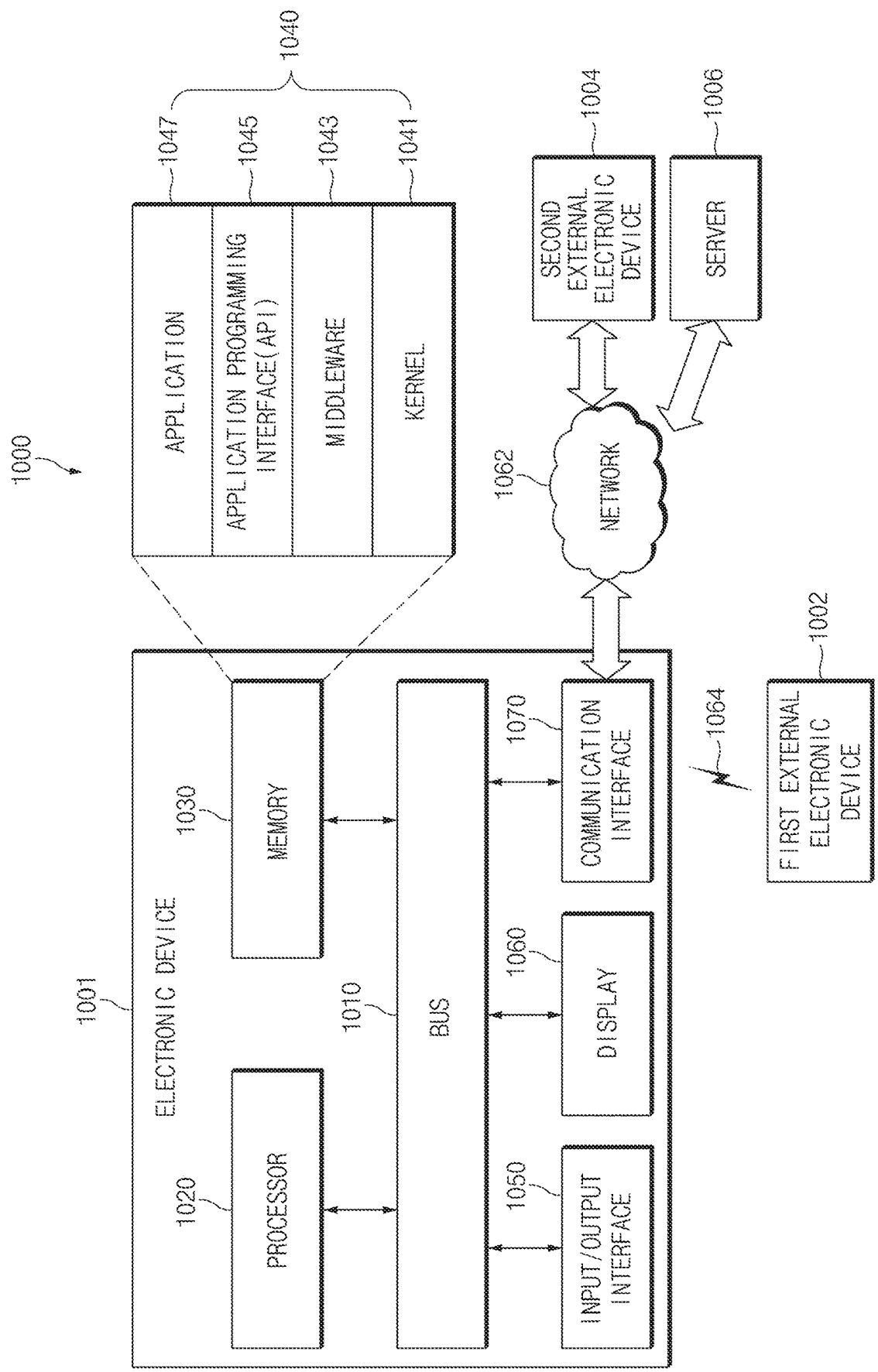
FIG. 10 is a view illustrating an electronic device in a network environment according to various embodiments of the present disclosure.

FIG. 10 illustrates an electronic device in a network environment according to an embodiment of the present disclosure.

Referring to FIG. 10, an electronic device 1001 in a network environment 1000 according to various embodiments of the present disclosure will be described with reference to FIG. 10. The electronic device 1001 may include a bus 1010, a processor 1020, a memory 1030, an input/output interface 1050, a display 1060, and a communication interface 1070. In various embodiments of the present disclosure, at least one of the foregoing elements may be omitted or another element may be added to the electronic device 1001.

The bus 1010 may include a circuit for connecting the above-mentioned elements 1010 to 1070 to each other and transferring communications (e.g., control messages and/or data) among the above-mentioned elements.

The processor 1020 may include at least one of a CPU, an AP, or a communication processor (CP). The processor 1020 may perform data processing or an operation related to communication and/or control of at least one of the other elements of the electronic device 1001.

The memory 1030 may include a volatile memory and/or a nonvolatile memory. The memory 1030 may store instructions or data related to at least one of the other elements of the electronic device 1001. According to an embodiment of the present disclosure, the memory 1030 may store software and/or a program 1040. The program 1040 may include, for example, a kernel 1041, a middleware 1043, an application programming interface (API) 1045, and/or an application program (or an application) 1047. At least a portion of the kernel 1041, the middleware 1043, or the API 1045 may be referred to as an operating system (OS).

The kernel 1041 may control or manage system resources (e.g., the bus 1010, the processor 1020, the memory 1030, and the like) used to perform operations or functions of other programs (e.g., the middleware 1043, the API 1045, or the application program 1047). Furthermore, the kernel 1041 may provide an interface for allowing the middleware 1043, the API 1045, or the application program 1047 to access individual elements of the electronic device 1001 in order to control or manage the system resources.

The middleware 1043 may serve as an intermediary so that the API 1045 or the application program 1047 communicates and exchanges data with the kernel 1041.

Furthermore, the middleware 1043 may handle one or more task requests received from the application program 1047 according to a priority order. For example, the middleware 1043 may assign at least one application program 1047 a priority for using the system resources (e.g., the bus 1010, the processor 1020, the memory 1030, and the like) of the electronic device 1001. For example, the middleware 1043 may handle the one or more task requests according to the priority assigned to the at least one application, thereby performing scheduling or load balancing with respect to the one or more task requests.

The API 1045, which is an interface for allowing the application 1047 to control a function provided by the kernel 1041 or the middleware 1043, may include, for example, at least one interface or function (e.g., instructions) for file control, window control, image processing, character control, and the like.

The input/output interface 1050 may serve to transfer an instruction or data input from a user or another external device to (an)other element(s) of the electronic device 1001. Furthermore, the input/output interface 1050 may output instructions or data received from (an)other element(s) of the electronic device 1001 to the user or another external device.

The display 1060 may include, for example, a liquid crystal display (LCD), a light-emitting diode (LED) display, an organic LED (OLED) display, a microelectromechanical systems (MEMS) display, or an electronic paper display. The display 1060 may present various content (e.g., a text, an image, a video, an icon, a symbol, and the like) to the user. The display 1060 may include a touch screen, and may receive a touch, gesture, proximity or hovering input from an electronic pen or a part of a body of the user.

The communication interface 1070 may set communications between the electronic device 1001 and an external device (e.g., a first external electronic device 1002, a second external electronic device 1004, or a server 1006). For example, the communication interface 1070 may be connected to a network 1062 via wireless communications or wired communications so as to communicate with the external device (e.g., the second external electronic device 1004 or the server 1006).

The wireless communications may employ at least one of cellular communication protocols, such as long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1064. The short-range communications may include at least one of Wi-Fi, Bluetooth, Bluetooth low energy (BLE), ZigBee, NFC, MST, or GNSS. The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used.

The wired communications may include at least one of universal serial bus (USB), high definition multimedia interface (HDMI), recommended standard 232 (RS-232), plain old telephone service (POTS), and the like. The network 1062 may include at least one of telecommunications networks, for example, a computer network (e.g., local area network (LAN) or wide area network (WAN)), the internet, or a telephone network.

The types of the first external electronic device 1002 and the second external electronic device 1004 may be the same as or different from the type of the electronic device 1001. According to an embodiment of the present disclosure, the server 1006 may include a group of one or more servers. A portion or all of operations performed in the electronic device 1001 may be performed in one or more other electronic devices (e.g., the first electronic device 1002, the second external electronic device 1004, or the server 1006). When the electronic device 1001 should perform a certain function or service automatically or in response to a request, the electronic device 1001 may request at least a portion of functions related to the function or service from another device e.g., the first electronic device 1002, the second external electronic device 1004, or the server 1006) instead of or in addition to performing the function or service for itself. The other electronic device (e.g., the first electronic device 1002, the second external electronic device 1004, or the server 1006) may perform the requested function or additional function, and may transfer a result of the performance to the electronic device 1001. The electronic device 1001 may use a received result itself or additionally process the received result to provide the requested function or service. To this end, for example, a cloud computing technology, a distributed computing technology, or a client-server computing technology may be used.

Figure 11:
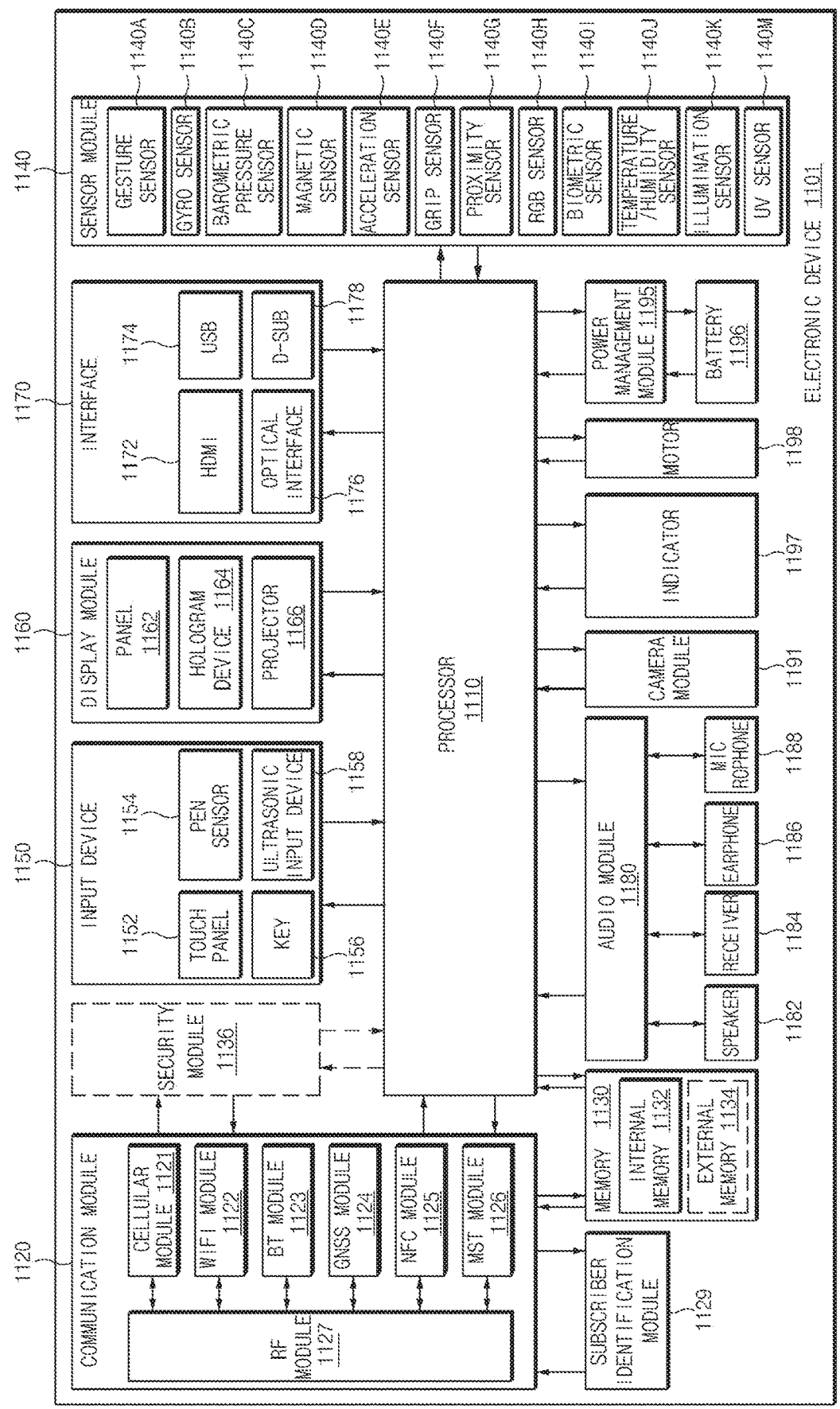
FIG. 11 is a block diagram illustrating an electronic device according to various embodiments of the present disclosure.

FIG. 11 is a block diagram illustrating an electronic device according to an embodiment of the present disclosure.

Referring to FIG. 11, an electronic device 1101 may include, for example, a part or the entirety of the electronic device 1001 illustrated in FIG. 10. The electronic device 1101 may include at least one processor (e.g., AP) 1110, a communication module 1120, a subscriber identification module (SIM) 1129, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may run an OS or an application program so as to control a plurality of hardware or software elements connected to the processor 1110, and may process various data and perform operations. The processor 1110 may be implemented with, for example, an SoC. According to an embodiment of the present disclosure, the processor 1110 may further include a GPU and/or an image signal processor (ISP). The processor 1110 may include at least a portion (e.g., a cellular module 1121) of the elements illustrated in FIG. 11. The processor 1110 may load, on a volatile memory, an instruction or data received from at least one of other elements (e.g., a nonvolatile memory) to process the instruction or data, and may store various data in a nonvolatile memory.

The communication module 1120 may have a configuration that is the same as or similar to that of the communication interface 1070 of FIG. 10. The communication module 1120 may include, for example, a cellular module 1121 (e.g., the modem 330), a Wi-Fi module 1122, a Bluetooth module 1123, a GNSS module 1124 (e.g., a GPS module, a GLONASS module, a BeiDou module, or a Galileo module), an NTT module 1125, a MST module 1126 and a radio frequency (RF) module 1127.

The cellular module 1121 may provide, for example, a voice call service, a video call service, a text message service, or an internet service through a communication network. The cellular module 1121 may identify and authenticate the electronic device 1101 in the communication network using the SIM 1129 (e.g., a SIM card). The cellular module 1121 may perform at least a part of functions that may be provided by the processor 1110. The cellular module 1121 may include a CP.

Each of the Wi-Fi module 1122, the Bluetooth module 1123, the GNSS module 1124, the NFC module 1125 and the MST module 1126 may include, for example, a processor for processing data transmitted/received through the modules. According to some various embodiments of the present disclosure, at least a part (e.g., two or more) of the cellular module 1121, the module 1122, the Bluetooth module 1123, the GNSS module 1124, the NFC module 1125 and the MST module 1126 may be included in a single integrated chip (IC) or IC package.

The RF module 1127 may transmit/receive, for example, communication signals (e.g., RF signals). The RF module 1127 may include, for example, a transceiver, a power amp module (PAM), a frequency filter, a low noise amplifier an antenna, and the like. According to an embodiment of the present disclosure, at least one of the cellular module 1121, the Wi-Fi module 1122, the Bluetooth module 1123, the GNSS module 1124, the NFC module 1125 and the MST module 1126 may transmit/receive RF signals through a separate RF module.

The SIM 1129 may include, for example, an embedded SIM and/or a card containing the subscriber identity module, and may include unique ID information (e.g., an integrated circuit card identifier (ICCID)) or subscriber information (e.g., international mobile subscriber identity (LMSI)).

The memory 1130 (e.g., the memory 1030) may include, for example, an internal memory 1132 or an external memory 1134. The internal memory 1132 may include at least one of a volatile memory (e.g., a dynamic random access memory (DRAM), a static RAM (SRAM), a synchronous DRAM (SDRAM), and the like), a nonvolatile memory (e.g., a one-time programmable read only memory (OTPROM), a PROM, an erasable and programmable ROM (EPROM), an electrically erasable and programmable ROM (EEPROM), a mask ROM, a flash ROM, a flash memory (e.g., a NAND flash memory, a NOR flash memory, and the like)), a hard drive, or a solid state drive (SSD).

The external memory 1134 may include a flash drive, such as a compact flash (CF), a secure digital (SD), a micro-SD, a mini-SD, an extreme digital (xD), a multimedia card (MMC), a memory stick, and the like. The external memory 1134 may be operatively and/or physically connected to the electronic device 1101 through various interfaces.

A security module 1136, which is a module including a storage space that is higher in security level than the memory 1130, may be a circuit for securing safe data storage and protected execution circumstances. The security module 1136 may be implemented with an additional circuit and may include an additional processor. The security module 1136 may be present in an attachable smart chip or SD card, or may include an embedded secure element (eSE), which is installed in a fixed chip. Additionally, the security module 1136 may be driven in another OS which is different from the OS of the electronic device 1101. For example, the security module 1136 may operate based on a java card open platform (JCOP) OS.

The sensor module 1140 may, for example, measure physical quantity or detect an operation state of the electronic device 1101 so as to convert measured or detected information into an electrical signal. The sensor module 1140 may include, for example, at least one of a gesture sensor 1140A, a gyro sensor 1140B, a. barometric pressure sensor 1140C, a magnetic sensor 1140D, an acceleration sensor 1140E, a grip sensor 1140F, a proximity sensor 1140G, a color sensor 1140H (e.g., a red/green/blue (RGB) sensor), a biometric sensor 1140I, a temperature/humidity sensor 1140J, an illumination sensor 1140K, or an ultraviolet (UV) sensor 1140M. Additionally or alternatively, the sensor module 1140 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1140 may further include a control circuit for controlling at least one sensor included therein. In some various embodiments of the present disclosure, the electronic device 1101 may further include a processor configured to control the sensor module 1140 as a part of the processor 1110 or separately, so that the sensor module 1140 is controlled while the processor 1110 is in a sleep state.

The input device 1150 may include, for example, a touch panel 1152, a (digital) pen sensor 1154, a key 1156, or an ultrasonic input device 1158. The touch panel 1152 may employ at least one of capacitive, resistive, infrared, and UV detection methods. The touch panel 1152 may further include a control circuit. The touch panel 1152 may further include a tactile layer so as to provide a haptic feedback to a user.

The (digital) pen sensor 1154 may include, for example, a sheet for recognition which is a part of a touch panel or is separate. The key 1156 may include, for example, a physical button, an optical button, or a keypad. The ultrasonic input device 1158 may detect ultrasonic waves generated by an input tool through a microphone 1188 so as to identify data corresponding to the ultrasonic waves.

The display 1160 (e.g., the display 1060) may include a panel 1162, a hologram device 1164, or a projector 1166. The panel 1162 may have a configuration that is the same as or similar to that of the display 1060 of FIG. 10. The panel 1162 may be, for example, flexible, transparent, or wearable. The panel 1162 and the touch panel 1152 may be integrated into a single module. The hologram device 1164 may display a stereoscopic image in a space using a interference phenomenon. The projector 1166 may project light onto a screen so as to display an image. The screen may be disposed in the inside or the outside of the electronic device 1101. According to an embodiment of the present disclosure, the display 1160 may further include a control circuit for controlling the panel 1162, the hologram device 1164, or the projector 1166.

The interface 1170 may include, for example, an HDMI 1172, a USB 1174, an optical interface 1176, or a D-sub-miniature (D-sub) 1178. The interface 1170, for example, may be included in the communication interface 1070 illustrated in FIG. 10. Additionally or alternatively, the interface 1170 may include, for example, a mobile high-definition link (MHL) interface, an SD card/MMC interface, or an infrared data association (IrDA) interface.

The audio module 1180 may convert, for example, a sound into an electrical signal or vice versa. At least a portion of elements of the audio module 1180 may be included in the input/output interface 1050 illustrated in FIG. 10. The audio module 1180 may process sound information input or output through a speaker 1182, a receiver 1184, an earphone 1186, or the microphone 1188, The camera module 1191 is, for example, a device for shooting a still image or a video. According to an embodiment of the present disclosure, the camera module 1191 may include at least one image sensor e.g., a front sensor or a rear sensor), a lens, an ISP, or a flash (e.g., an LED or a xenon lamp).

The power management module 1195 may manage power of the electronic device 1101. According to an embodiment of the present disclosure, the power management module 1195 may include a power management IC (PMIC), a charger IC, or a battery or gauge. The PMIC may employ a wired and/or wireless charging method. The wireless charging method may include, for example, a magnetic resonance method, a magnetic induction method, an electromagnetic method, and the like. An additional circuit for wireless charging, such as a coil loop, a resonant circuit, a rectifier, and the like, may be further included. The battery gauge may measure, for example, a remaining capacity of the battery 1196 and a voltage, current or temperature thereof while the battery is charged. The battery 1196 may include, for example, a rechargeable battery and/or a solar battery.

The indicator 1197 may display a specific state of the electronic device 1101 or a part thereof (e.g., the processor 1110), such as a booting state, a message state, a charging state, and the like. The motor 1198 may convert an electrical signal into a mechanical vibration, and may generate a vibration or haptic effect. Although not illustrated, a processing device (e.g., a GPU) for supporting a mobile TV may be included in the electronic device 1101. The processing device for supporting a mobile TV may process media data according to the standards of digital multimedia broadcasting (DMB), digital video broadcasting (DVB), Media-FLO™, and the like.

Figure 12:
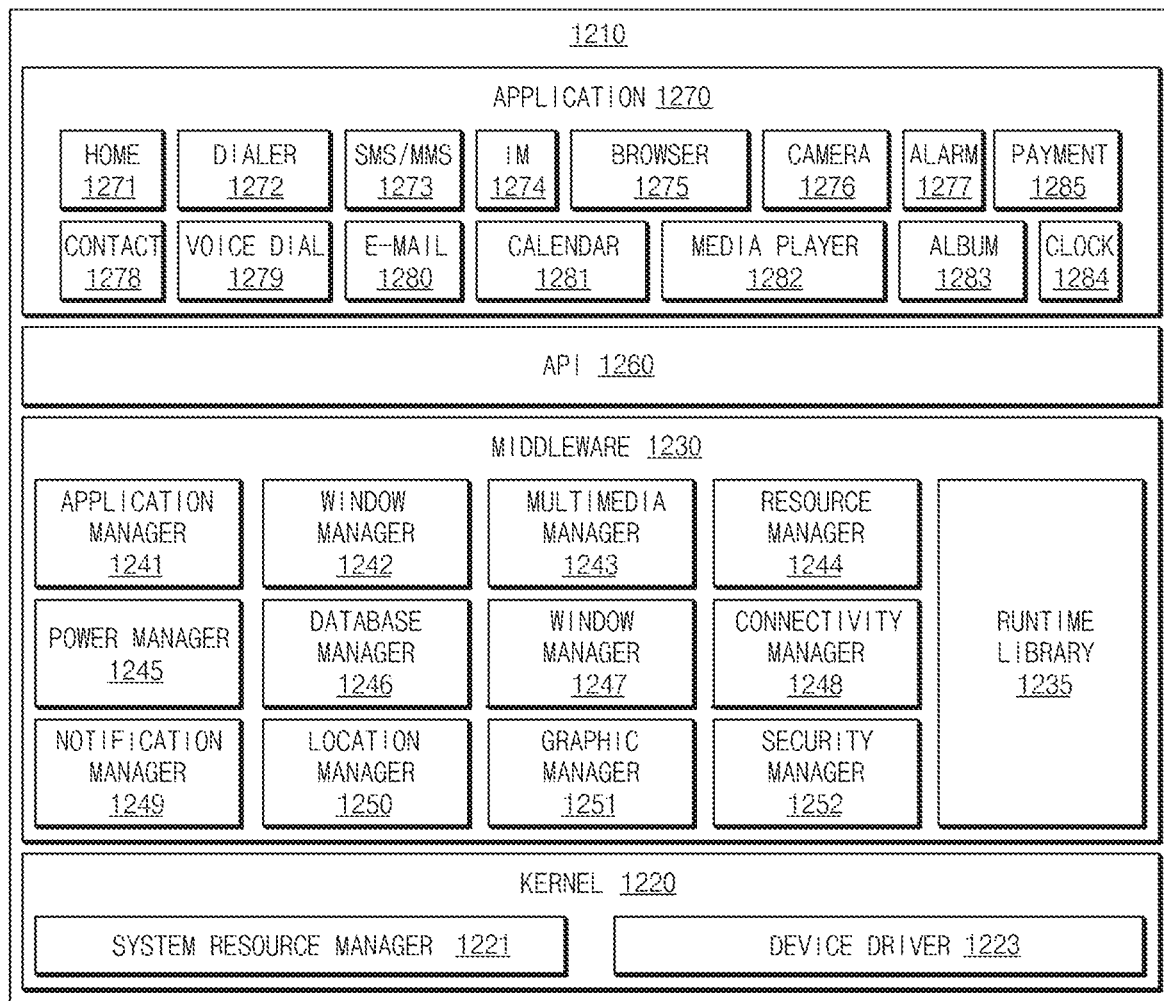
FIG. 12 is a block diagram of a program module according to various embodiments of the present disclosure.

FIG. 12 is a block diagram illustrating a program module according to an embodiment of the present disclosure.

Referring to FIG. 12, a program module 1210 (e.g., the program 1040) may include an OS for controlling a resource related to an electronic device (e.g., the electronic device 1001) and/or various applications (e.g., the application program 1047) running on the OS. The OS may be, for example, Android, iOS, Windows, Symbian, Tizen, and the like.

The program module 1210 may include a kernel 1220, a middleware 1230, an API 1260, and/or an application 1270. At least a part of the program module 1210 may be preloaded on an electronic device or may be downloaded from an external electronic device e.g., the first electronic device 1002, the second external electronic device 1004, or the server 1006).

The kernel 1220 (e.g., the kernel 1041) may include, for example, a system resource manager 1221 or a device driver 1223. The system resource manager 1221 may perform control, allocation, or retrieval of a system resource. According to an embodiment of the present disclosure, the system resource manager 1221 may include a process management unit, a memory management unit, a file system management unit, and the like. The device driver 1223 may include, for example, a display driver, a camera driver, a Bluetooth driver, a shared memory driver, a USB driver, a keypad driver, a Wi-Fi driver, an audio driver, or an inter-process communication (IPC) driver.

The middleware 1230, for example, may provide a function that the applications 1270 require in common, or may provide various functions to the applications 1270 through the API 1260 so that the applications 1270 may efficiently use limited system resources in the electronic device. According to an embodiment of the present disclosure, the middleware 1230 (e.g., the middleware 1043) may include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251 and a security manager 1252.

The runtime library 1235 may include, for example, a library module that a compiler uses to add a new function through a programming language while the application 1270 is running. The runtime library 1235 may perform a function for input/output management, memory management, or an arithmetic function.

The application manager 1241 may mange, for example, a life cycle of at least one of the applications 1270. The window manager 1242 may manage a graphical user interface (GUI) resource used in a screen. The multimedia manager 1243 may recognize a format required for playing various media files and may encode or decode a media file using a codec matched to the format. The resource manager 1244 may manage a resource, such as a source code, a memory, or a storage space of at least one of the applications 1270.

The power manager 1245, for example, may operate together with a basic input/output system (MOS) to manage a battery or power and may provide power information required for operating the electronic device. The database manager 1246 may generate, search, or modify a database to be used in at least one of the applications 1270. The package manager 1247 may manage installation or update of an application distributed in a package file format.

The connectivity manger 1248 may manage wireless connection of Wi-Fi Bluetooth, and the like. The notification manager 1249 may display or notify an event, such as message arrival, appointments, and proximity alerts in such a manner as not to disturb a user. The location manager 1250 may manage location information of the electronic device. The graphic manager 1251 may manage a graphic effect to he provided to a user or a user interface related thereto. The security manager 1252 may provide various security functions required for system security or user authentication. According to an embodiment of the present disclosure, in the case in which an electronic device (e.g., the electronic device 1001) includes a phone function, the middleware 1230 may further include a telephony manager for managing a voice or video call function of the electronic device.

The middleware 1230 may include a middleware module for forming a combination of various functions of the above-mentioned elements. The middleware 1230 may provide a module specialized for each type of an OS to provide differentiated functions. Furthermore, the middleware 1230 may delete a part of existing elements or may add new elements dynamically.

The API 1260 (e.g., the API 1045) which is, for example, a set of API programming functions may be provided in different configurations according to an OS. For example, in the case of Android or iOS, one API set may be provided for each platform, and, in the case of Tizen, at least two API sets may be provided for each platform.

The application 1270 (e.g., the application program 1047), for example, may include at least one application capable of performing functions, such as a home application 1271, a dialer application 1272, an SMS/MMS application 1273, an IM application 1274, a browser application 1275, a camera application 1276, an alarm application 1277, a contact application 1278, a voice dial application 1279, an e-mail application 1280, a calendar application 1281, a media player application 1282, an album application 1283, a clock application 1284, health care application (e.g., measure an exercise amount or blood sugar), or environmental information provision (e.g., provide air pressure, humidity, or temperature information), and a payment application 1285.

According to an embodiment of the present disclosure, the application 1270 may include an information exchange application for supporting information exchange between the electronic device (e.g., the electronic device 1001) and an external electronic device (e.g., the first electronic device 1002 or the second external electronic device 1004). The information exchange application may include, for example, a notification relay application for relaying specific information to the external electronic device or a device management application for managing the external electronic device.

For example, the notification relay application may have a function for relaying, to an external electronic device (e.g., the first electronic device 1002 or the second external electronic device 1004), notification information generated in another application (e.g., an SMS/MMS application, an e-mail application, a health care application, an environmental information application, and the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 1002 or the second external electronic device 1004 communicating with the electronic device, an application running in the external electronic device, or a service e.g., a call service, a message service, and the like) provided from the external electronic device.

According to an embodiment of the present disclosure, the application 1270 may include a specified application (e.g., a healthcare application of a mobile medical device) according to an attribute of the external electronic device (e.g., the first electronic device 1002 or the second external electronic device 1004). The application 1270 may include an application received from an external electronic device (e.g., the first electronic device 1002 or the second external electronic device 1004). The application 1270 may include a preloaded application or a third-party application downloadable from a server. The names of the elements of the program module 1210 illustrated may vary with the type of an OS.

According to various embodiments of the present disclosure, at least a part of the program module 1210 may be implemented with software, firmware, hardware, or a combination thereof. At least a part of the program module 1210, for example, may be implemented (e.g., executed) by a processor (e.g., the processor 210). At least a part of the program module 1210 may include, for example, a module, a program, a routine, sets of instructions, or a process for performing at least one function.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may he a part thereof. The "module" may he a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing sonic operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1020), the processor may perform functions corresponding to the instructions. The computer-readable storage medium may be, for example, the memory 1030.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memo (ROM), a RAM, Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present disclosure, a second user, who has a similar interest with a first user, may conveniently share content that the first user subscribes to. Besides, in-use efficiency of the service may increase by providing the second user with content in various ways through an electronic device, in which the content subscription application is not installed, of the second user.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a communication device configured to communicate with an external device;
an input device configured to receive a user input;
a display; and
a processor configured to:
receive a first user input related to receiving a content subscription list of a second user through the input device,
send a request for the receiving of the content subscription list of the second user to a content providing server through the communication device,
receive the content subscription list of the second user from the content providing server through the communication device, in response to the request,
differently display content, to which the first user subscribes, and content, to which the first user does not subscribe, among content included in the content subscription list of the second user, through the display,
send selection information of at least one content included in the content subscription list to the content providing server, if an input for selecting the at least one content is received, and
receive at least one first-type content corresponding to the selection information from the content providing server, wherein the at least one first-type content is supported by a content subscription application which is installed in the electronic device, or
receive at least one second-type content corresponding to the selection information from the content providing server, wherein the at least one second-type content is supported by an application different from the content subscription application.

2. The electronic device of claim 1, wherein the processor is further configured to:
display a user interface which comprises the content subscription list of the second user, if the content subscription list of the second user is received from the content providing server, and
receive the input for selecting the at least one content included in the content subscription list through the user interface.

3. The electronic device of claim 1, wherein the processor is further configured to:
display the content, to which the second user subscribes, on the display by using a user interface provided by a content subscription application, if the content subscription application is installed in the electronic device, and
display the content, to which the second user subscribes, on the display by using a user interface provided by another application different from the content subscription application, if the content subscription application is not installed in the electronic device.

4. The electronic device of claim 3, wherein the another application comprises at least one of a calendar application, an alarm application, a web browsing application, a schedule application, a message application, an e-mail application, and a gallery application.

5. A content providing method of an electronic device, the method comprising:
receiving a first user input related to receiving a content subscription list of a second user;
sending a request for the receiving of the content subscription list of the second user to a content providing server;
receiving the content subscription list of the second user from the content providing server, in response to the request;
differently displaying content, to which the first user subscribes, and content, to which the first user does not subscribe, among content included in the content subscription list of the second user;
sending selection information of at least one content included in the content subscription list to the content providing server, if an input for selecting the at least one content is received; and
receiving at least one first-type content corresponding to the selection information from the content providing server, wherein the at least one first-type content is supported by a content subscription application which is installed in the electronic device, or
receiving at least one second-type content corresponding to the selection information from the content providing server, wherein the at least one second-type content is supported by an application different from the content subscription application.

6. The method of claim 5, wherein the receiving of the input further comprises:
displaying a user interface, which includes the content subscription list of the second user, on a display, if another content subscription list of the first user is received from the content providing server; and
receiving the input for selecting the at least one content included in the content subscription list of the second user through the user interface.

7. The method of claim 5, further comprising:
- displaying the content, to which the second user subscribes, on a display by using a user interface provided by a content subscription application, if the content subscription application is installed in the electronic device; and
- displaying the content, to which the second user subscribes, on the display by using a user interface provided by another application different from the content subscription application, if the content subscription application is not installed in the electronic device.

8. The method of claim 7, wherein the another application comprises at least one of a calendar application, an alarm application, a web browsing application, a schedule application, a message application, an e-mail application, and a gallery application.

* * * * *